(12) United States Patent
England

(10) Patent No.: US 7,325,145 B1
(45) Date of Patent: Jan. 29, 2008

(54) VERIFYING THE PRESENCE OF AN ORIGINAL DATA STORAGE MEDIUM

(75) Inventor: Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 09/507,191

(22) Filed: Feb. 18, 2000

(51) Int. Cl.
*H04L 9/00* (2006.01)

(52) U.S. Cl. ............... 713/187; 713/153; 713/176; 726/26; 709/206; 380/201; 380/206

(58) Field of Classification Search ............ 713/187, 713/176, 153; 380/206, 283, 201; 709/206; 726/26

See application file for complete search history.

(56) References Cited

U.S. PATENT DOCUMENTS

| | | | |
|---|---|---|---|
| 5,745,678 A * | 4/1998 | Herzberg et al. | 713/200 |
| 6,367,019 B1 * | 4/2002 | Ansell et al. | 713/201 |
| 6,577,735 B1 * | 6/2003 | Bharat | 380/286 |
| 6,625,295 B1 * | 9/2003 | Wolfgang et al. | 382/100 |
| RE38,375 E * | 12/2003 | Herzberg et al. | 726/24 |
| 7,243,236 B1 * | 7/2007 | Sibert | 713/179 |
| 2004/0105545 A1 * | 6/2004 | Khandelwal et al. | 380/232 |

OTHER PUBLICATIONS

David Aucsmith, IAL "Tamper Resistant Software: An Implementation", Information Hiding, First International Workshop, Cambridge, UK, May 30-Jun. 1, 1996, Proceedings, pp. 317-333.*
Aucsmith, IAL, "Tamper Resistant Software An Implementation", Information Hiding, First International Workshop, Cambridge, U.K., May 30-Jun. 1, 1996 Proceedings, p. 317-333.
Article: "SDMI Publishes Open Standard for Portable Devices, Joint Industry Initiative Accelerates Access to Digital Music", 4 pages.

* cited by examiner

*Primary Examiner*—Nasser Moazzami
*Assistant Examiner*—Carl Colin
(74) *Attorney, Agent, or Firm*—Lee & Hayes, PLLC

(57) ABSTRACT

A verification system randomly retrieves data from a removable data storage medium. The retrieved data is compared to corresponding verification data, which is known to be valid. The system determines that a legitimate removable data storage medium is present if the retrieved data matches the corresponding verification data. The removable data storage medium can be partitioned into multiple blocks of data. A cryptographic digest is calculated for each data block. The digests are compared to determine whether the retrieved data matches the verification data. The removable data storage medium may be a compact disc (CD) or a digital versatile disc (DVD).

19 Claims, 7 Drawing Sheets

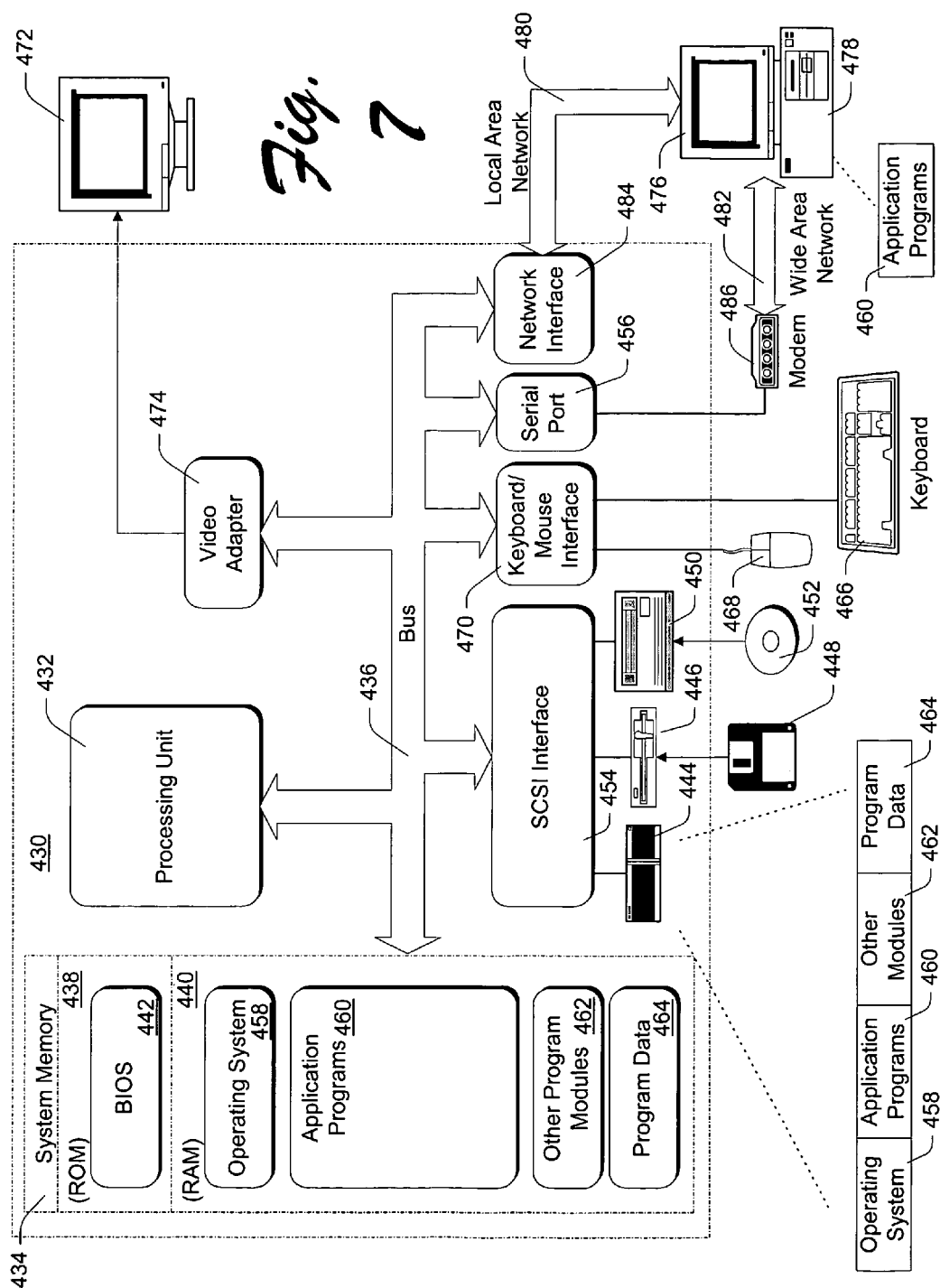

VERIFYING THE PRESENCE OF AN ORIGINAL DATA STORAGE MEDIUM

TECHNICAL FIELD

This invention relates to verification systems and methods. More particularly, the invention relates to systems and methods that verify the existence of an original data storage medium, such as a compact disc.

BACKGROUND OF THE INVENTION

Application programs for use on computer-based systems are often distributed on compact discs (CDs) or digital versatile discs (DVDs). DVDs may also be referred to as digital video discs. Generally, the content of entire CDs and DVDs is too large to distribute across the Internet (CDs can store more than 500 MB of data and DVDs are capable of storing more than 4 GB of data). However, many application programs that are distributed on CD or DVD utilize only a small portion of the available storage space on the CD or DVD. If the size of the application program is small enough, pirated copies of the software might be distributed across a network, such as the Internet. To prevent this type of software piracy, it is desirable to determine whether an original CD or DVD (containing the application program) is present in a computing device that is attempting to launch the application.

To determine whether an original CD or DVD is present, an undesirable solution provides a verification system that uses a computer system to compare every byte of data stored on the CD or DVD with a known valid copy of the data stored on the computer system. This solution is undesirable for two reasons. First, the solution requires reading the entire CD or DVD, which is time-consuming. Second, the solution requires storage of a known valid copy of the data on the computer system. Storage of such a large amount of data may not be practical on many computer systems. Further, the required storage space is increased with each new application program that must be verified by the computer system.

Another problem arises when software pirates combine multiple application programs on a single CD or DVD. Since many application programs do not use the entire storage space available on the CD or DVD, software pirates create CDs or DVDs that contain multiple application programs. Although the actual program code may be identical to a legitimate copy of the application program, the excess data stored on the pirated CD or DVD does not match the corresponding lack of data on the legitimate CD or DVD. Thus, it is desirable to provide a verification system that is able to identify otherwise accurate copies of application programs improperly stored on a CD or DVD with other application programs.

Similarly, music is commonly distributed on CDs and, to a lesser degree, on DVDs. The manufacturers of certain music CDs and DVDs may offer additional products or services to customers who purchase music CDs and DVDs. Before offering these additional products or services, the manufacturer must verify that the individual requesting the product or service has obtained a legitimate copy of the original music CD or DVD.

Furthermore, customers purchasing legitimate music CDs and DVDs may use an application program (commonly referred to as a "ripper" application) to extract raw audio data from a CD or DVD and convert the raw audio data to a particular format, such as MP3 (MPEG Audio Layer 3). MP3 is an audio compression technology that compresses CD-quality audio data into music files. MP3 music files are played back on a computer system using an appropriate software program or installed, for example, on a handheld device for playback. To prevent unauthorized copying or distribution of MP3 music files, it is desirable to verify that the user attempting to play or install an MP3 music file has a legitimate copy of the original music CD or DVD.

One solution to this verification problem is to read a particular piece of data from the CD or DVD, such as the volume identifier. The verification system compares the volume identifier read from the CD or DVD to an expected value. If the volume identifier matches the expected value, then the CD or DVD is "verified." This verification solution is easily defeated by copying the particular piece of data to the appropriate location on the pirated CD or DVD. Thus, a better verification solution is needed to discourage piracy.

As discussed above, attempting to compare every byte of data stored on a CD or DVD with a known valid copy of the data is impractical. The present invention provides a system that verifies the existence of an original data storage medium, such as a CD or DVD, without requiring an analysis of every byte of data stored on the CD or DVD.

SUMMARY OF THE INVENTION

The present invention allows a computer system or other device to determine whether an original CD or DVD is present. If an original CD or DVD is not present, the requested application will not launch or the requested music will not play. Thus, pirated media or pirated software distributed without an original CD or DVD will not function properly. The invention determines whether an original CD or DVD is present by requesting one or more randomly chosen data blocks from the CD or DVD. The requested data is read from the CD or DVD and verified against known valid data (e.g., the data that is present on a legitimate CD or DVD). If the requested data matches the known valid data, then the requested operation (e.g., launch an application program or play a music file) is allowed. Since the requested data segments are chosen at random, a pirate cannot know which data segments will be chosen for verification. Furthermore, different data segments are selected during each verification process.

Particular embodiments of the invention partition the removable data storage medium into multiple blocks of data. A cryptographic digest is then calculated for each data block. The digests are compared to determine whether the retrieved data matches the verification data.

In one embodiment of the invention the removable data storage medium is a compact disc (CD).

In another embodiment of the invention, the removable data storage medium is a digital versatile disc (DVD).

An implementation of the invention provides a verification system including a data reading device that reads data from a removable data storage medium. A verification module coupled to the data reading device randomly retrieves data from the removable data storage medium. The verification module compares the retrieved data to corresponding verification data that is known to be valid. The verification module determines that a legitimate removable data storage medium is present if the retrieved data matches the corresponding verification data.

BRIEF DESCRIPTION OF THE DRAWINGS

FIG. 7 is a block diagram showing pertinent components of a computer in accordance with the invention.

DETAILED DESCRIPTION

The discussion herein assumes that the reader is familiar with cryptography. For a basic introduction to cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

The present invention provides a verification system that allows a verifying device to determine whether an original data storage medium (e.g., a compact disc (CD) or digital versatile disc (DVD)) is present. If an original data storage medium is not present, then the requested application or function will not be performed. This verification system effectively disables pirated media or pirated software distributed via a network without an original data storage medium or an exact facsimile. The verification system also disables the operation of pirated application programs stored on a data storage medium along with other pirated application programs. Particular embodiments of the invention are described herein with reference to verifying application programs and audio files, such as music files. However, the teachings of the present invention can be applied to any type of data or data arrangement stored on a data storage medium, and is of particular interest when a functionally equivalent version of the application or passive media (e.g., a song or a video), which is much smaller than the original (through compression, or by omitting parts of the application or data), can be distributed instead of the original.

Figure 1:
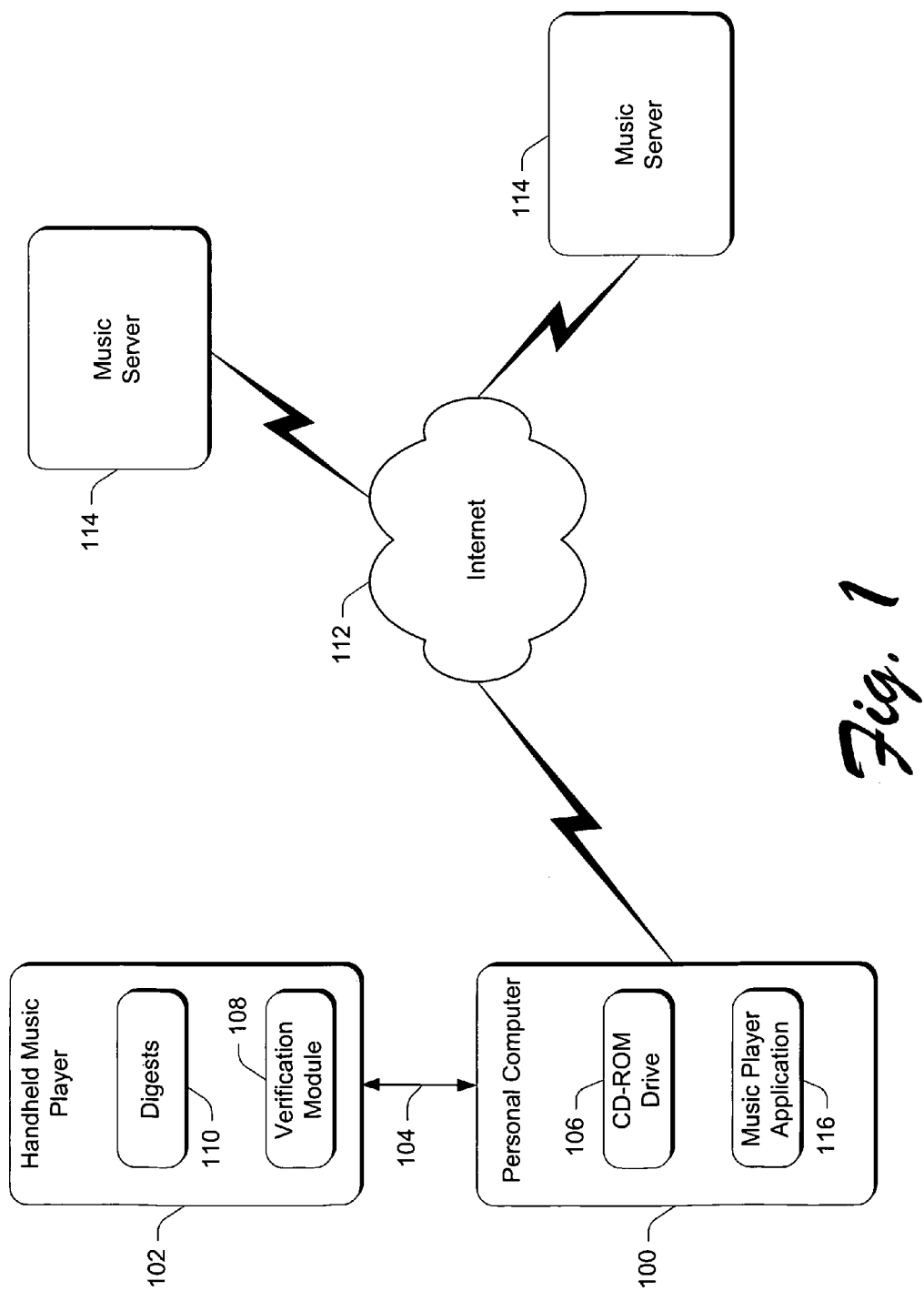
FIG. 1 illustrates an exemplary network environment in which a personal computer is able to retrieve music files across the Internet and install the music files in a handheld music player.

FIG. 1 illustrates an exemplary network environment in which a personal computer 100 is able to retrieve music files (or other files containing audio data) across the Internet and install the music files in a handheld music player 102. Although the example of FIG. 1 illustrates handheld music player 102, alternate embodiments may utilize any type of audio player or audio playback device. Personal computer 100 and music player 102 are coupled together through a communication link 104. Communication link 104 may utilize any type of communication medium and any communication protocol. In a particular embodiment, communication link 104 is a universal serial bus (USB) connection.

Personal computer 100 includes a CD-ROM (compact disc read-only memory) drive 106. Additionally, personal computer 100 may include a DVD-ROM (digital versatile disc read-only memory) drive (not shown) instead of or in addition to CD-ROM drive 106. A CD-ROM and a DVD-ROM are examples of data reading devices. A DVD-ROM drive may be capable of reading both CDs and DVDs. Throughout this description of the invention, any reference to a CD or CD-ROM drive shall be understood to have a similar application to a DVD or a DVD-ROM drive. For example, any reference to a music file or application program stored on a CD and read by a CD-ROM drive shall also apply to a music file or application program stored on a DVD and read by a DVD-ROM drive. Although the invention is described in examples that include CDs and DVDs, the teachings of the invention can be applied to any type of removable data storage medium (such as removable diskettes and removable memory cards).

Handheld music player 102 is capable of storing and playing music files encoded in a format such as MP3 (MPEG Audio Layer 3). Although particular examples are described herein with reference to MP3, the teachings of the present invention can be applied to any audio data encoding format. Music player 102 contains a verification module 108 and a table of one or more digests 110. Verification module 108 verifies that an original music CD is present in CD-ROM drive 106 and that the CD contains a music file that corresponds to a music file stored in the music player 102. Digests 110 are cryptographic digests representing blocks of data on an original CD. As shown in FIG. 1, the verification module 108 and the digests 110 are located in music player 102. However, in alternate embodiments, the verification module 108 and/or the digests 110 may be located in computer 100. Additional details regarding the verification module 108 and the digests 110 are provided below.

Referring again to FIG. 1, computer 100 is coupled to the Internet 112. A pair of music servers 114 are also coupled to the Internet 112. The music servers 114 contain various music files stored in the MP3 format. A music file may be an entire song (also referred to as a "track"), a collection of multiple songs (e.g., the entire content of a music CD), a portion of a song, or any other type of file containing audio data. Computer 100 accesses the music servers 114 to download various music files. The downloaded music files may be installed on handheld music player 102 for playback by the music player, or may be stored on computer 100 for playback on the computer using a music player application 116. The music player application 116 is also capable of extracting raw audio data from, for example, a CD in CD-ROM drive 106 and converting the raw audio data into MP3 music files for playback on personal computer 100 or music player 102. To discourage unauthorized copying or distribution of MP3 music files, verification module 108 in music player 102 prevents the installation or playback of music files unless the MP3 file is legitimately obtained from a music server 114 or a legitimate copy of the original music CD is present in CD-ROM drive 106. An exemplary verification procedure is discussed below with respect to FIG. 2.

In an alternate embodiment of the invention, music player 102 is coupled directly to a CD-ROM drive through a communication link. In this embodiment, a computer is not required because the verification module 108 communicates directly with the CD-ROM drive to verify that the user of music player 102 has a legitimate CD that corresponds to the music file to be played or installed on the music player. In this alternate embodiment, music player 102 may be coupled directly to the Internet 112. This arrangement allows the music player 102 to download music files across the Internet 112 from music servers 114.

Figure 2:
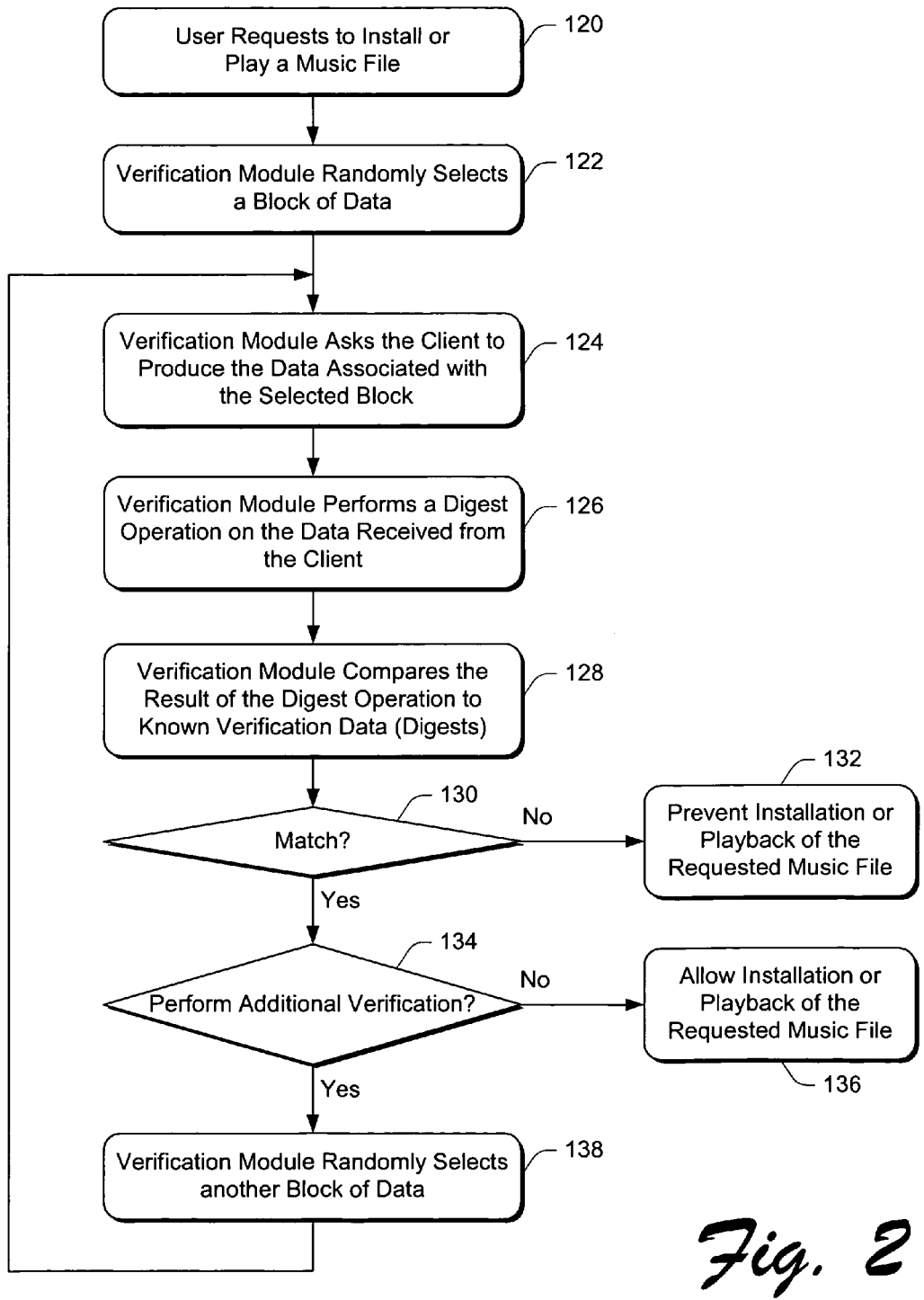
FIG. 2 is a flow diagram illustrating a procedure for verifying the existence of an original data storage medium before playing or installing a music file.

FIG. 2 is a flow diagram illustrating a procedure for verifying the existence of an original data storage medium (for example, a music CD) before playing or installing a music file. This procedure could be used for before any song is played, but would more likely be triggered by the existence of a "watermark" embedded in the song that indicates that the music is protected and warrants special treatment.

Initially, a user requests to install or play a music file (step 120). The request may be entered at computer 100 or music player 102. Before allowing the installation or playback of the music file, the verification module 108 randomly selects a block of data associated with the requested music file (step 122). The verification module 108 then asks the client (in this case, the computer 100) to produce the data associated with the selected block from the corresponding music CD in CD-ROM drive 106 (step 124). After receiving the requested data from computer 100, the verification module 108 performs a digest operation on the received data (step 126). The digest operation is a cryptographic operation that processes a block of data such that the resulting digest is significantly smaller in size than the original block of data. The requirements for the cryptographic digest operation are that the resulting digest should be smaller than the original data, but still large enough to minimize the chances that two data blocks digest to the same value (typically, a few hundred bits are appropriate), and that it is computationally infeasible to find two data blocks that digest to the same value. An example of a suitable hashing operation is SHA (secure hash algorithm).

The table of digests 110 shown in FIG. 1 represent a table of the results of the digest calculation as applied to all blocks of a known legitimate CD. Thus, the table of digests 110 represent known verification data. The same cryptographic calculation or algorithm is used in step 126 and to generate the table of digests 110. If the music CD in the CD-ROM drive 106 is legitimate, then the digest of any block on the CD will match the corresponding digest entry in the table of digests 110.

After performing the digest operation on the received data, the verification module 108 compares the result of the digest operation to the known verification data contained in digests 110 (step 128). If the comparison does not result in a match, then the procedure prevents the installation or playback of the requested music file (step 132). However, if the comparison results in a match, then the procedure determines whether to perform additional verification (step 134). In a particular example, the procedure of FIG. 2 verifies three different random blocks before determining that the CD in the CD-ROM drive 106 is legitimate. If no additional verification is required, then the procedure allows the installation or playback of the requested music file (step 136). If additional verification is required, then the verification module 108 randomly selects another block of data (step 138) and returns to request the appropriate block of data from the client (step 124).

Figure 3:
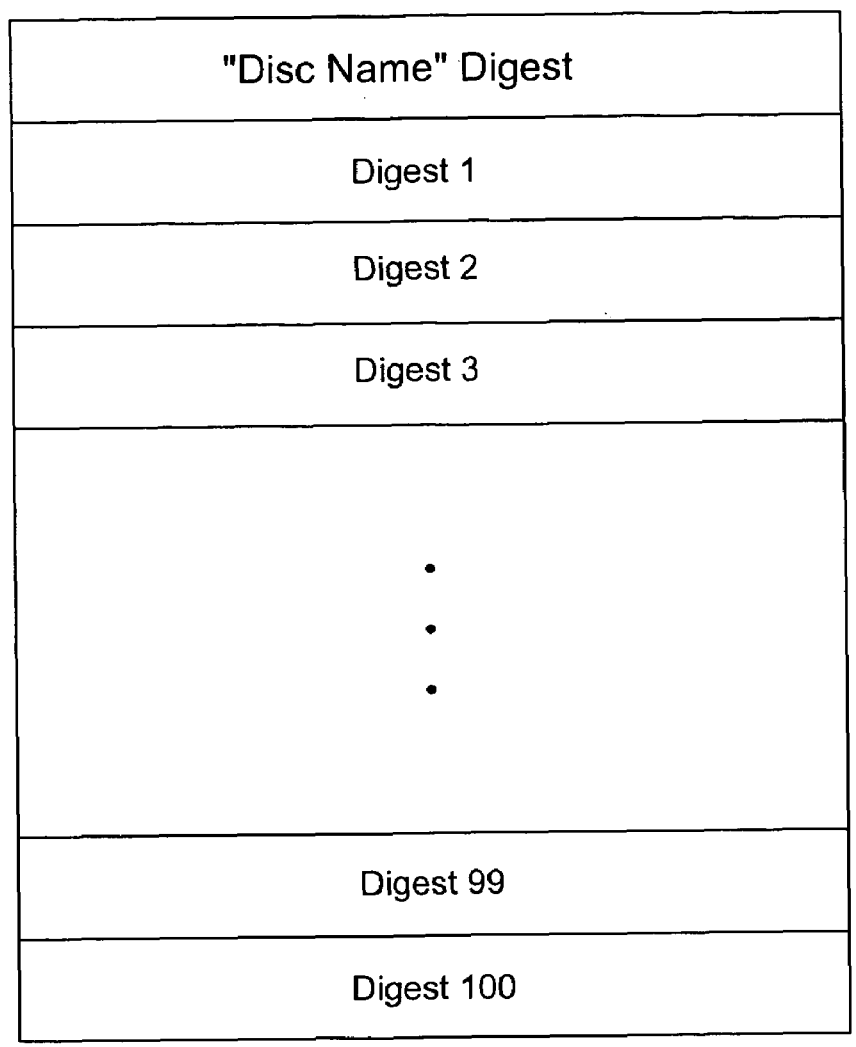
FIG. 3 illustrates a table of digests for a particular music CD.

FIG. 3 illustrates a table of digests 150 for a particular music CD. The first entry in the table of digests 150 identifies the name of the CD with which the digest is associated. Each subsequent entry in the table of digests 150 identifies the result of the digest operation performed on a block of data of a known legitimate CD. The table of digests 150 is typically created when the CD is created. A copy of the table of digests 150 can be stored on the original CD itself and may be read from the CD by the verification module. Alternatively, a copy of the table of digests 150 can be made publicly available on an internet web site. In the example of FIG. 3, the table of digests 150 contains digests for 100 different blocks. Thus, the known legitimate CD was partitioned into 100 blocks of data. The digest operation was performed on each block of data to generate the digests 150. As discussed above, during a verification process, several blocks are selected at random for verification. If the result of the digest operation on each of the selected blocks matches the corresponding digest value stored in the table of digests 150, then the CD in the CD-ROM drive is considered legitimate.

If the verification process is performed by a presumed secure web server to provide additional media or other services to legitimate owners of the original recording media, a simple table of digests is sufficient. However, in the case of a device or program in which the verification module is under the control of the user, additional measures are required to protect the integrity of the table of digests. Otherwise, a pirate could distribute a fake digest table with the pirated media. A suitable way of protecting digest lists from tampering is to digitally sign the digest list with a signature provided by a reputable authority (e.g., a certification authority). In this case, the verification module can verify that the digest table comes from a know authority by checking its certificate. Additionally, the verification module can check that the digest list has not been tampered by checking that the signature matches the data in the table. Many digital signature methods are available and appropriate. An suitable example is DSA, or the digital signature algorithm.

The use of digests discussed above significantly reduces the amount of data that must be stored by the verifying device. For example, music player 102 in FIG. 1 stores the table of digests 110 which is significantly smaller than the entire content of the CD in drive 106. Additionally, by randomly selecting a few data blocks for verification, the amount of data communicated between the music player 102 and the personal computer is significantly reduced. Since the selected data blocks are chosen at random, a person trying to distribute pirated copies cannot know which data blocks will be selected during a particular verification process.

Figure 4:
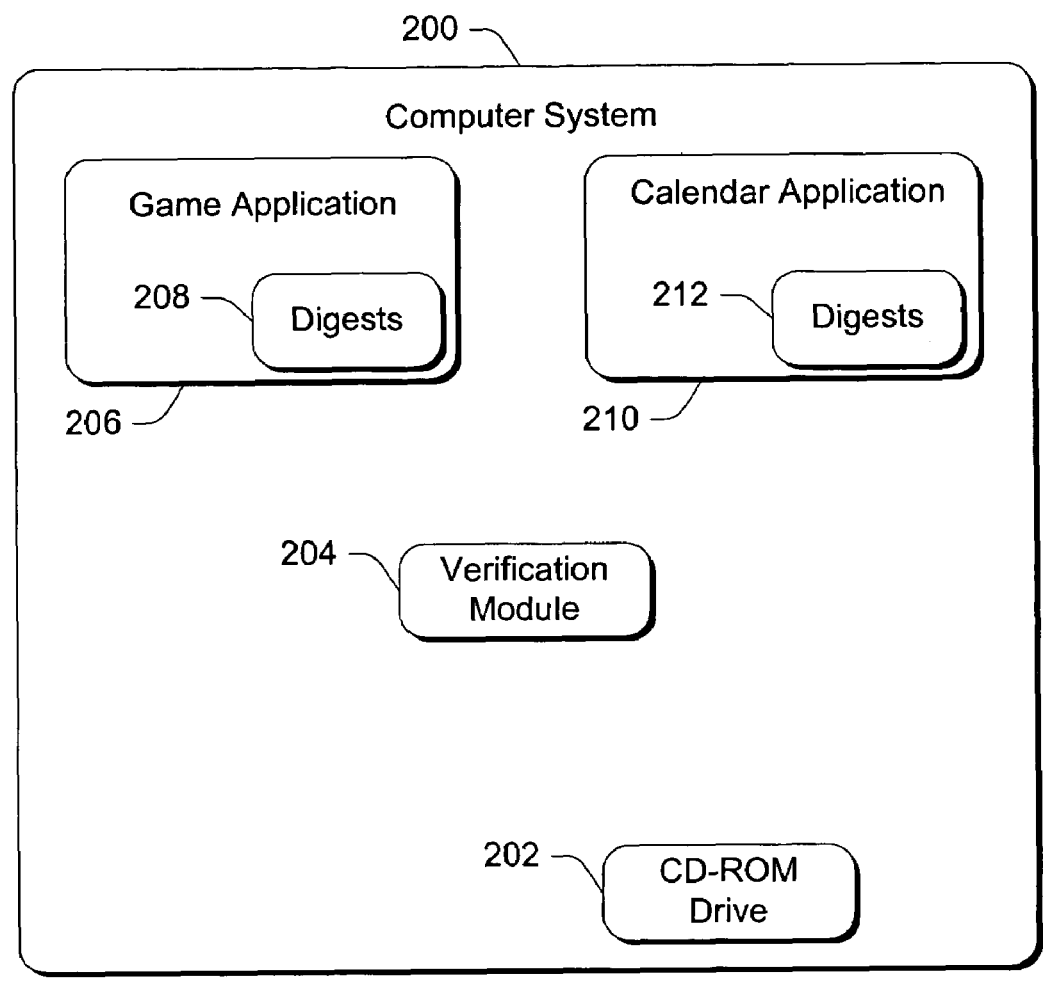
FIG. 4 illustrates an exemplary computer system containing two application programs and a verification module.

FIG. 4 illustrates an exemplary computer system 200 containing two application programs 206 and 210 and a verification module 204. Computer system 200 also contains a CD-ROM drive 202. When attempting to launch either the game application program 206 or the calendar application program 210, the verification module 204 verifies that CD-ROM drive 202 contains an original program CD containing the application being launched. This verification helps discourage software piracy by requiring the presence of an original program CD prior to launching the application program. Each application program 206 and 210 has embedded therein a table of digests 208 and 212, respectively. Verification module 204 uses the data contained in digests 208 and 212 during the verification process.

In this case, the verification module is embedded in the application itself, which would allow a pirate to disable the verification part of the application installation and launch to defeat the verification module. To make disabling the verifier harder, a software publisher could use the techniques of "software tamper resistance" which makes it difficult for an attacker to modify a program without the program refusing to run, or running improperly. An example of suitable techniques is described in "Tamper Resistant Software: An Implementation", David Aucsmith, IHW'96—Proc. of the First International Information hiding Workshop, Vol. 1174 (1997), pp. 317-333.

The table of digests can also be protected using the signature technique already described, or be embedded into the application itself in a way that is hard to modify.

Figure 5:
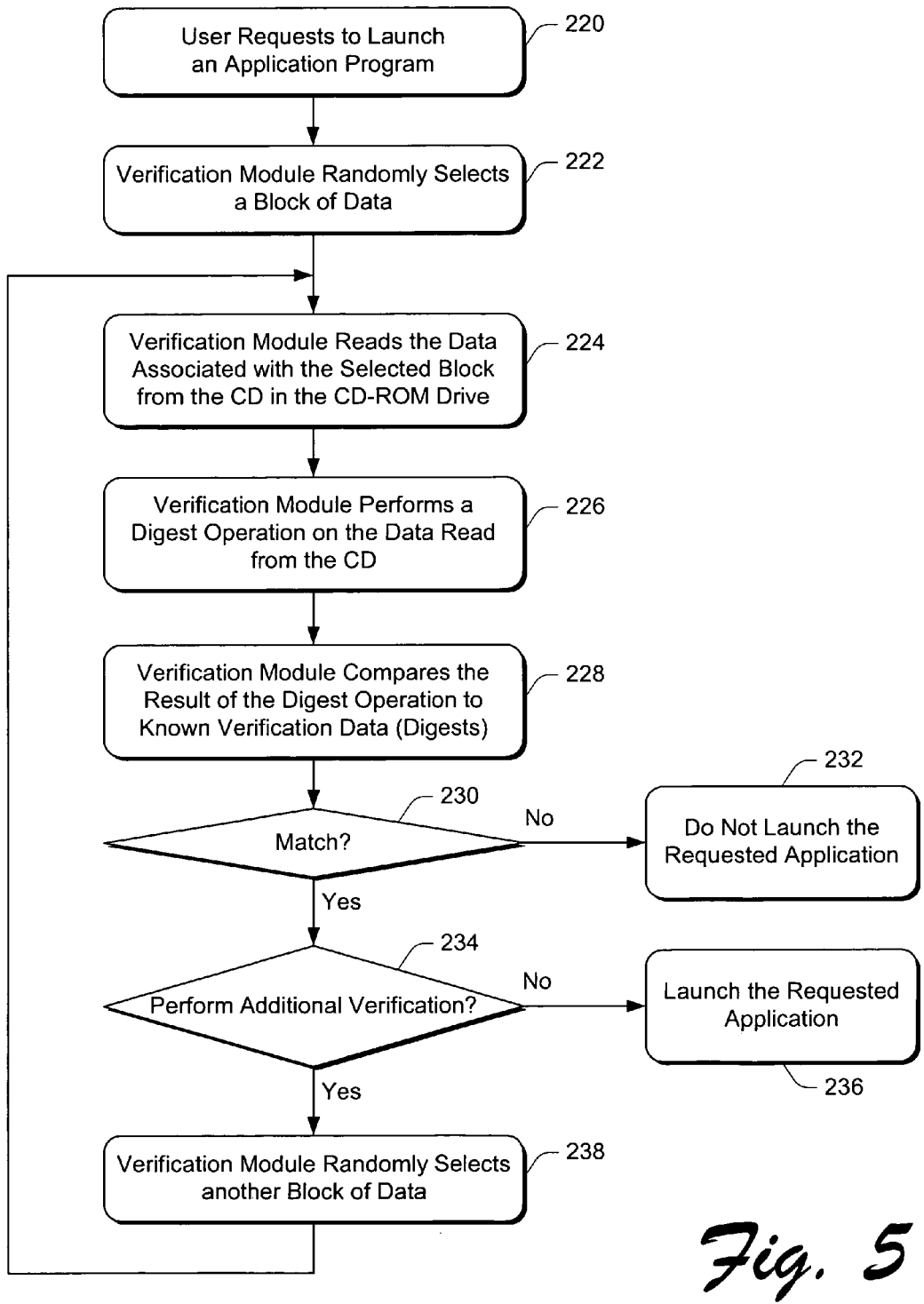
FIG. 5 is a flow diagram illustrating a procedure for verifying the existence of an original compact disc before launching an application program.

FIG. 5 is a flow diagram illustrating a procedure for verifying the existence of an original compact disc before launching an application program. The procedure begins when a user requests to launch an application program (step 220). The verification module randomly selects a block of data to be verified (step 222). The verification module reads the data associated with the selected block from the program CD in CD-ROM drive 202 (step 224) and performs a digest operation on the data read from the program CD (step 226). The result of the digest operation is then compared to the known verification data contained in the table of digests associated with the application to be launched (step 228). If the result of the digest operation does not match the known verification data, then the procedure does not launch the requested application (step 232). In this situation, a message may be displayed to the user of the computer system requesting the insertion of the original program CD into the CD-ROM drive.

If the result of the digest operation matches the known verification data, then the procedure determines whether additional verification is necessary (step 234). If no additional verification is necessary, then the procedure launches the requested application (step 236). If additional verification is necessary, then the verification module selects another block of data (step 238) and returns to read the data associated with the selected block from the program CD (step 224).

As discussed above, many application programs do not utilize all of the storage space available on a CD. In these instances, the unused portions of the CD (which would otherwise be empty) can be filled with random data. The entire CD (including the random data) is partitioned into blocks, thereby discouraging the production of pirated CDs that contain multiple applications.

Figure 6:
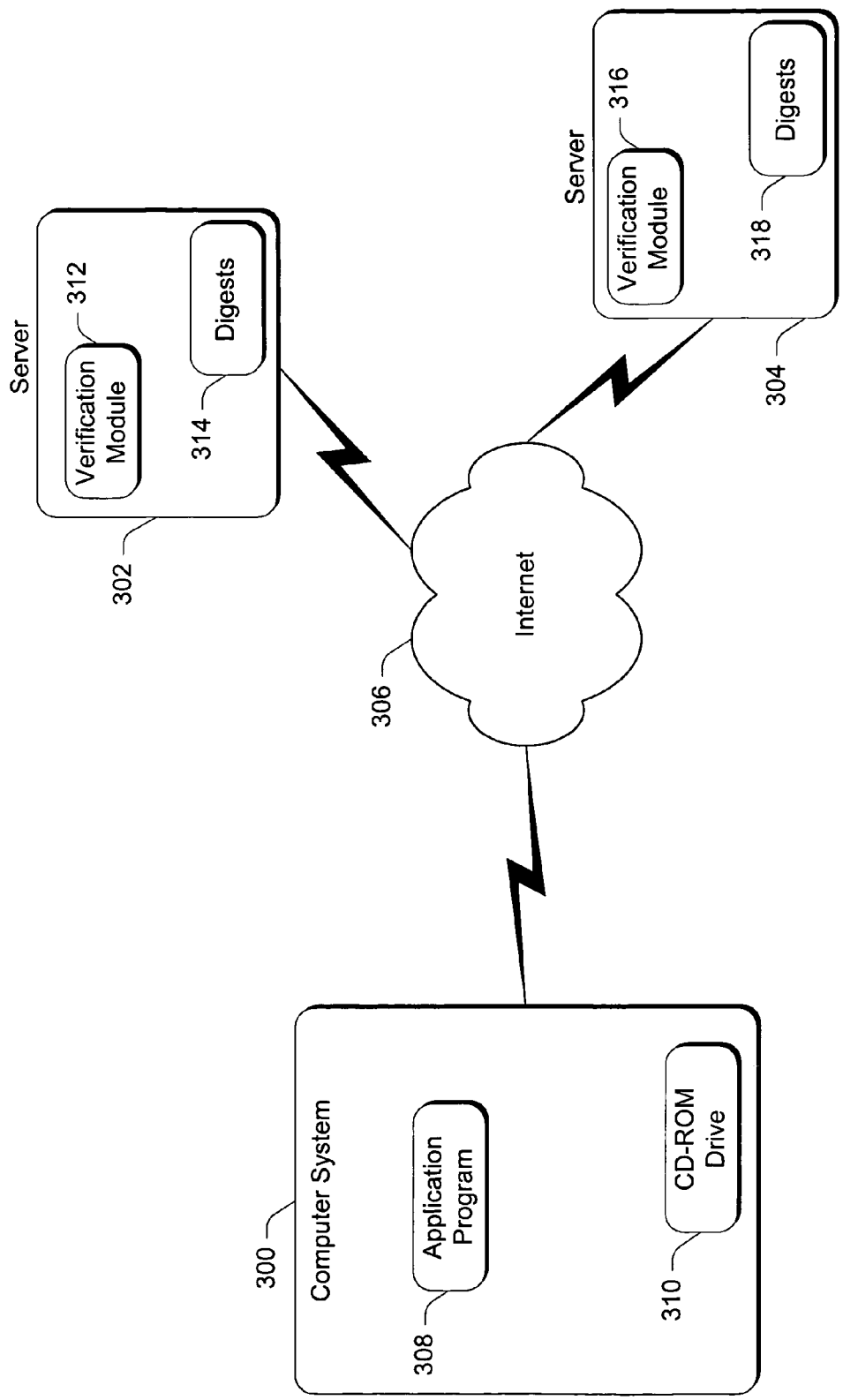
FIG. 6 illustrates an exemplary environment in which a remote server verifies whether an original CD is present in a local computer system.

FIG. 6 illustrates an exemplary environment in which a remote server verifies whether an original CD is present in a local computer system 300. Computer system 300 is coupled to servers 302 and 304 via the Internet 306. The computer system 300 includes an application program 308 and a CD-ROM drive 310. Server 302 includes a verification module 312 and a table of digests 314. Similarly, server 304 includes a verification module 316 and a table of digests 318. When a user of computer system 300 attempts to launch application program 308, the application program initiates contact with an appropriate server, such as the application program manufacturer's web server. Once contacted, the server's verification module verifies that the original program CD is in the CD-ROM drive 310. The server accomplishes this verification by requesting (through its verification module) that the computer system provide certain blocks of data from the program CD in the CD-ROM drive 310. The requested data is read from the program CD and communicated across the Internet 306 to the verification module. The verification module performs a digest operation on the received data and compares the result to the corresponding entry in the table of digests. If all of the data blocks match, then the server sends authorization to the computer system 300 to launch the application program. If one of the data blocks does not match, then the server instructs the computer system 300 not to launch the application program.

The configuration shown in FIG. 6 may require the transmission of a significant amount of data between computer system 300 and the server 302 or 304 during the verification process. For example, if the program CD is partitioned into 100 blocks, each block may contain over 5 Mb of data. If the verification process reads four blocks of data, 20 Mb of data would be transmitted across the Internet 306. Increasing the number of blocks will reduce the amount of data that must be transmitted across the Internet for each block. For example, increasing the number of blocks to 1000 reduces the amount of data per block to approximately 500 Kb. If the verification process reads four blocks of data, 2 Mb of data would be transmitted across the Internet 306.

The amount of data transmitted across the Internet 306 during the verification process can be further reduced using a keyed-hash or message authentication code (MAC) function. In this situation, the verification module in the server provides a randomly selected data block number and a challenge (typically, a random number) to the computer system 300. The computer system 300 hashes together the challenge and the content of the selected data block on the program CD. A suitable message authentication code is Message Authentication Algorithm (MAA). The computer system 300 then returns the result of the hash operation to the server. This procedure significantly reduces the amount of data that is transmitted across the Internet 306 because the hash operation is performed on the computer system 300, thereby eliminating the need to transmit the block data across the Internet. Software pirates cannot predict the result of the hash operation because both the challenge and the data block are selected at random. Although this use of a challenge and a hash operation has been described with reference to the embodiment of FIG. 6, this procedure can be used in any of the embodiments discussed above.

A particular embodiment of the invention may be used by a manufacturer to distribute "bonus" music tracks to purchasers of music CDs. For example, a customer purchases a particular music CD. The manufacturer of the music CD offers free additional music tracks in MP3 format, available from the manufacturer's music server (also referred to as a web site). Before the customer is permitted to download the additional music tracks, the manufacturer verifies that the customer has the original music CD in the CD-ROM drive. In this situation, the verification module is located in the manufacturer's music server, and the random data blocks are retrieved from the music CD across the Internet. If an original music CD is verified, then the music server downloads the bonus music tracks to the customer for playback on a personal computer or a handheld music player.

In another exemplary use of the invention, purchasers of application programs may download upgrades or "bonus" material related to the application program. The manufacturer verifies that the customer has an original program CD using the procedures discussed above. If an original program CD is verified, then the manufacturer downloads an application upgrade and/or additional materials to the customer. If an original program CD cannot be verified, then the upgrade and additional materials are not downloaded.

FIG. 7 shows a general example of a computer 430 that can be used with the present invention. A computer such as that shown in FIG. 7 can be used, for example, to perform various procedures necessary to verify that an original CD is present in the CD-ROM drive, and to run various applications, such as a music player application. The computer shown in FIG. 7 can also be used to perform the calculations necessary to compute the digest value associated with particular blocks of data. Furthermore, the computer shown in FIG. 7 can function as a server (such as a music server) of the type discussed above.

Computer 430 includes one or more processors or processing units 432, a system memory 434, and a bus 436 that couples various system components including the system memory 434 to processors 432. The bus 436 represents one or more of any of several types of bus structures, including a memory bus or memory controller, a peripheral bus, an accelerated graphics port, and a processor or local bus using any of a variety of bus architectures. The system memory 434 includes read only memory (ROM) 438 and random access memory (RAM) 440. A basic input/output system (BIOS) 442, containing the basic routines that help to transfer information between elements within computer 430, such as during start-up, is stored in ROM 438.

Computer 430 further includes a hard disk drive 444 for reading from and writing to a hard disk (not shown), a magnetic disk drive 446 for reading from and writing to a removable magnetic disk 448, and an optical disk drive 450 for reading from or writing to a removable optical disk 452 such as a CD ROM or other optical media. The hard disk drive 444, magnetic disk drive 446, and optical disk drive 450 are connected to the bus 436 by an SCSI interface 454 or some other appropriate interface. The drives and their associated computer-readable media provide nonvolatile storage of computer-readable instructions, data structures, program modules and other data for computer 430. Although the exemplary environment described herein employs a hard disk, a removable magnetic disk 448 and a removable optical disk 452, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 444, magnetic disk 448, optical disk 452, ROM 438, or RAM 440, including an operating system 458, one or more application programs 460, other program modules 462, and program data 464. A user may enter commands and information into computer 430 through input devices such as a keyboard 466 and a pointing device 468. Other input devices (not shown) may include a microphone, joystick, game pad, satellite dish, scanner, or the like. These and other input devices are connected to the processing unit 432 through an interface 470 that is coupled to the bus 436. A monitor 472 or other type of display device is also connected to the bus 436 via an interface, such as a video adapter 474. In addition to the monitor, personal computers typically include other peripheral output devices (not shown) such as speakers and printers.

Computer 430 commonly operates in a networked environment using logical connections to one or more remote computers, such as a remote computer 476. The remote computer 476 may be another personal computer, a server, a router, a network PC, a peer device or other common network node, and typically includes many or all of the elements described above relative to computer 430, although only a memory storage device 478 has been illustrated in FIG. 7. The logical connections depicted in FIG. 7 include a local area network (LAN) 480 and a wide area network (WAN) 482. Such networking environments are commonplace in offices, enterprise-wide computer networks, intranets, and the Internet.

When used in a LAN networking environment, computer 430 is connected to the local network 480 through a network interface or adapter 484. When used in a WAN networking environment, computer 430 typically includes a modem 486 or other means for establishing communications over the wide area network 482, such as the Internet. The modem 486, which may be internal or external, is connected to the bus 436 via a serial port interface 456. In a networked environment, program modules depicted relative to the personal computer 430, or portions thereof, may be stored in the remote memory storage device. It will be appreciated that the network connections shown are exemplary and other means of establishing a communications link between the computers may be used.

Generally, the data processors of computer 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention can be implemented in hardware or a combination of hardware, software, and/or firmware. For example, one or more application specific integrated circuits (ASICs) could be programmed to carry out the invention.

Thus, a system has been described that verifies the existence of an original data storage medium, such as a CD or DVD, without requiring an analysis of every byte of data stored on the CD or DVD. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   randomly retrieving a plurality of blocks of data from a computer-readable media, wherein at least one block of data includes data not contained in a given content;
   generating a digest value for each of the plurality of randomly retrieved blocks of data;
   comparing each of the digest values to a set of verification data;
   determining that the computer-readable media contains an original version of the given content if the digest values match a subset of the verification data; and
   allowing access to a functionally equivalent version of the given content, which is smaller than the original version, if the digest values match a subset of the verification data.

2. A method according to claim 1, further comprising allowing access to related material if the digest values match a subset of the verification data.

3. A method according to claim 1, wherein generating the digest value for each of the plurality of randomly retrieved blocks of data comprises calculating a cryptographic hash value.

4. A method according to claim 1, wherein the processes of randomly retrieving a plurality of blocks of data, generating digest values, comparing each of the digest values and determining that the computer-readable media contains an original version are performed when a watermark is embedded in the functionally equivalent version of the given content.

5. A method according to claim 1, further comprising:
partitioning a trusted version of the first content into a plurality of verification data blocks; and
establishing the plurality of verification data by calculating a cryptographic hash value for each of the plurality of verification data blocks.

6. One or more computer-readable memories containing a computer program that is executable by a processor to perform the method recited in claim 1.

7. A method comprising:
receiving a request to access a given content;
calculating a digest value for each of a set of blocks of data randomly retrieved from a computer-readable media, wherein at least one block of data includes data not contained in the given content;
verifying whether the received plurality of blocks are from an original version of the given content by comparing the calculated digest values to a set of associated verification digest values; and
controlling access to a functionally equivalent version of the given content, which is smaller than the original version, if the calculated digest values match a subset of the associated verification digest values.

8. The method according to claim 7, wherein controlling access to a functionally equivalent version of a given content comprises playing a requested music file if the calculated digest values match a subset of the associated verification digest values.

9. The method according to claim 7, wherein controlling access to a functionally equivalent version of a given content comprises launching a requested application program if the calculated digest values match a subset of the associated verification digest values.

10. The method according to claim 7, wherein controlling access to a functionally equivalent version of a given content comprises preventing installation of a requested music file if any of the calculated digest values do not match any associated digest value.

11. The method according to claim 7, wherein the set of associated verification digest values are stored with the original version of the given content.

12. The method according to claim 7, wherein the set of associated verification digest values are available on an internet web site.

13. The method according to claim 7, further comprising verifying that the set of associated verification digest values come from a known authority.

14. One or more computer-readable memories containing a computer program that is executable by a processor to perform the method recited in claim 7.

15. A verification system comprising:
a data reading device to read data from a computer-readable media; and
a verification module coupled to the data reading device, wherein the verification module is adapted to receive a request to access a given content, to request a random set of blocks of data from the computer-readable media that includes at least one block of data that does not contain the given content, to verify whether the received plurality of blocks are from an original version of the given content by comparing digest values of a received set of blocks of data to a corresponding set of known valid digest values, and to control access to a functionally equivalent version of the given content, which is smaller than the original version, if the calculated digest values match a subset of the known valid digest values.

16. A verification system as recited in claim 15, wherein the verification module is further adapted to control access to related material if the calculated digest values match a subset of the known valid digest values.

17. A verification system as recited in claim 15, wherein the verification module is located in a handheld audio player containing the functionally equivalent version of the given content and the data reading device is located in a computer system coupled to the handheld audio player.

18. A verification system as recited in claim 15, wherein the verification module is located in a server containing the corresponding set of known valid digest values and the data reading device is located in computer system coupled to the server.

19. A verification system as recited in claim 15, wherein the verification module and the data reading device are coupled to one another across the Internet.

* * * * *